United States Patent
Drewes et al.

(10) Patent No.: US 6,267,009 B1
(45) Date of Patent: Jul. 31, 2001

(54) CAPACITIVE PRESSURE SENSOR CELLS OR DIFFERENTIAL PRESSURE SENSOR CELLS AND METHODS FOR MANUFACTURING THE SAME

(75) Inventors: Ulfert Drewes, Müllheim; Elke Schmidt, Schopfheim; Andreas Rossberg, Bad Säckingen; Frank Hegner, Lörrach; Thomas Velten, Wehr, all of (DE)

(73) Assignee: Endress + Hauser GmbH + Co., Maulburg (DE)

( * ) Notice: Subject to any disclaimer, the term of this patent is extended or adjusted under 35 U.S.C. 154(b) by 0 days.

(21) Appl. No.: 09/505,489

(22) Filed: Feb. 16, 2000

Related U.S. Application Data

(60) Provisional application No. 60/129,086, filed on Apr. 13, 1999.

(51) Int. Cl.$^7$ ................. G01L 9/12; H01G 7/00
(52) U.S. Cl. ................. 73/718; 73/724; 361/283.4
(58) Field of Search ............... 73/718, 724, 715, 73/716, 717; 361/283.4, 283; 29/25.41

(56) References Cited

U.S. PATENT DOCUMENTS

| | | |
|---|---|---|
| 4,829,826 | 5/1989 | Valentin et al. |
| 4,944,187 | 7/1990 | Frick et al. ............. 73/718 |
| 5,050,034 | 9/1991 | Hegner et al. |
| 5,050,035 | 9/1991 | Hegner et al. ............. 361/283 |
| 5,334,344 | 8/1994 | Hegner et al. |
| 5,400,489 * | 3/1995 | Hegner et al. ............. 29/25.41 |
| 5,539,611 | 7/1996 | Hegner et al. ............. 361/283.4 |
| 5,665,921 | 9/1997 | Collingborn. |
| 5,670,063 | 9/1997 | Hegner et al. ............. 219/85.22 |
| 5,712,428 | 1/1998 | Schleiferbock. |
| 5,954,900 | 9/1999 | Hegner et al. |
| 5,992,240 | 11/1999 | Tsurvoka et al. ............. 73/718 |

FOREIGN PATENT DOCUMENTS

| | | |
|---|---|---|
| 2211471 | 1/1998 | (CA). |
| 3404262 | 9/1994 | (DE). |
| 0 735 353 | 10/1996 | (EP). |
| 0 834 487 | 4/1998 | (EP). |
| 0 835 716 | 4/1998 | (EP). |
| 0 849 576 | 6/1998 | (EP). |
| 2 125 167 | 2/1984 | (GB). |

* cited by examiner

Primary Examiner—Benjamin R. Fuller
Assistant Examiner—Abdullahi Aw-musse
(74) Attorney, Agent, or Firm—Bose McKinney & Evans LLP

(57) ABSTRACT

These capacitive pressure sensor cells have joints between substrates and diaphragms being both pressure and/or tension-proof and high-vacuum-tight and long-term-stable. The sensor cell comprises a ceramic substrate (1) having a cylindrical surface (11), a major surfaces (12, 13). The major surface (12) includes a concave central area (121) merging, in the direction of and up to said cylindrical surface (11), into a convex surface (124) having a vertex line (125) and forming a planar ring surface (126) in its area. An electrode (122) is located in the concave area (121). An electrical connection (123) extends from electrode (122) through the substrate (1) to surface (13). A ceramic diaphragm (5) has a planar inner surface (51) on which an electrode (52) is located and which rests on the ring surface (126) of the substrate (1). The diaphragm (5) is joined to the substrate by an active brazing solder forming a circumferential wedge zone (91) in the area of the substrate between the ring surface (126) and the cylindrical surface (11). An electrical connection to the electrode (52) is made through the wedge zone (91). Respective differential pressure sensors can comprise a central substrate (2) and two outer diaphragms (61, 71) or a central diaphragm (8) and two outer substrates (3, 4).

23 Claims, 3 Drawing Sheets

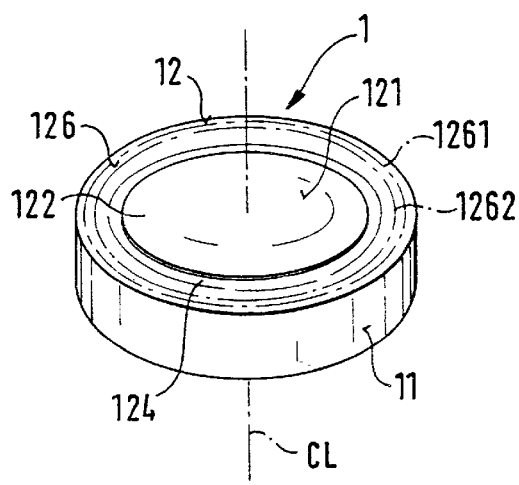
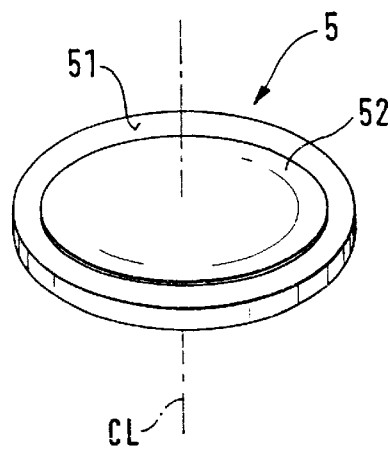
FIG. 1a
FIG. 1b
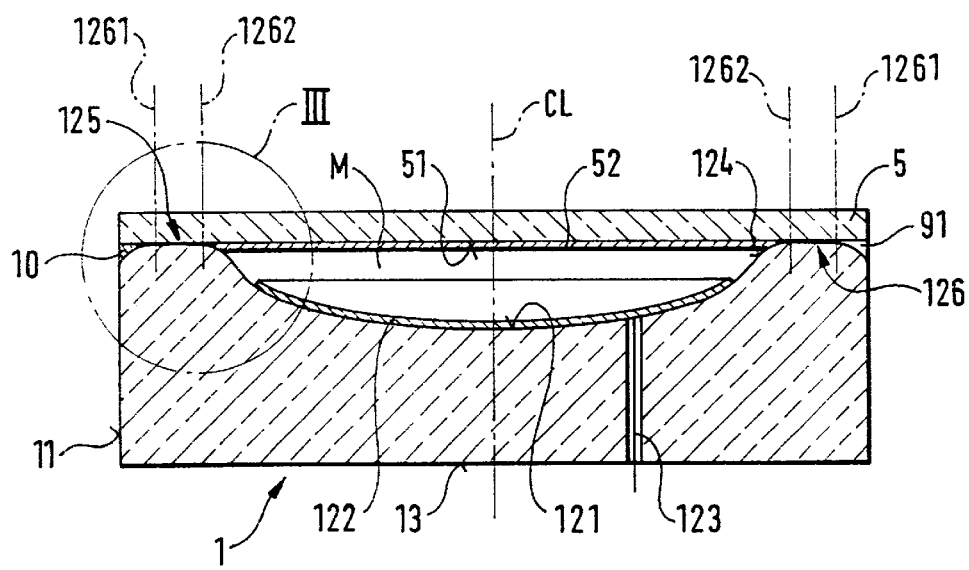
FIG. 2

CAPACITIVE PRESSURE SENSOR CELLS OR DIFFERENTIAL PRESSURE SENSOR CELLS AND METHODS FOR MANUFACTURING THE SAME

This application claims the benefit of Provisional Application 60/129,086 filed Apr. 13, 1999.

FIELD OF THE INVENTION

This invention relates to capacitive ceramic pressure sensor cells or differential pressure sensor cells and to methods for manufacturing the same.

BACKGROUND OF THE INVENTION

A capacitive ceramic pressure sensor cell commonly comprises a ceramic substrate and a ceramic diaphragm which covers the substrate and is spaced from the latter to form a sensing chamber between the diaphragm and a surface of the substrate facing the diaphragm. The facing surfaces of the substrate and the diaphragm are provided with electrodes which together form a capacitor that provides an electric signal which corresponds to a pressure of a process medium acting on and deforming the diaphragm. Under overload conditions, the substrate serves as a limiter for the movement of the diaphragm.

To measure a difference between two pressures (differential pressure), two sensing chambers are commonly used, one for each pressure, the sensing chambers being spatially and mechanically connected with one another and being provided with one sensing capacitor each. In this manner it is possible to produce an electric signal which corresponds to the difference between a pressure acting on one of the sensing chambers and a pressure acting on the other sensing chamber.

A particular problem encountered with ceramic pressure sensor cells is to fasten and join the diaphragm in its edge area to the substrate in such a manner that the joint is gasu and liquid-tight and can withstand high tensile and compressive loads. In addition, the joint is to be long-term-stable and free of relaxation effects.

Glass-frit joints used in conventional ceramic pressure sensor cells do not fully meet the above requirements. Therefore, a joint produced by means of an active brazing solder has been used.

U.S. Pat. No. 5,050,034, for example, discloses a capacitive pressure sensor cell comprising
  a ceramic substrate having
    a cylindrical surface and,
    at a first major surface, a central area which
      is provided with a first electrode and
      has an electrical connection from the first electrode through the substrate to a second major surface, and
  a ceramic diaphragm
    which is joined to the substrate using a plane-parallel ring of active brazing solder to form a high-vacuum-tight sensing chamber,
      with a second electrode being provided on a planar inner surface of the diaphragm facing the substrate.

The joint produced by means of active brazing solder meets the above-mentioned requirements for high stability, but in certain cases where the diaphragm is subjected to overpressure, it has turned out that the diaphragm cannot be supported on the substrate in a satisfactory manner. Because of the "angular" shape of the ring of active brazing solder, which serves as a spacer between the substrate and the diaphragm, tensile stresses may occur, particularly in the edge region of the diaphragm, which result in a failure of the diaphragm.

U.S. Pat. No. 4,329,826 discloses a capacitive differential pressure sensor cell comprising:
  a substrate having
    an edge area and,
    at a first major surface, a concave first central area which
      is provided with a first electrode,
      has a first electrical connection to the first electrode, and,
      in the direction of the edge area, merges into a convex first surface
        which has a first vertex line intersecting the edge area and
        forms a first planar ring surface in the area of the first vertex line,
    said substrate further having, at a second major surface opposite the first major surface, a concave second central area
      which is provided with a second electrode,
      has a second electrical connection to the second electrode, and,
      in the direction of the edge area, merges into a convex second surface which
        has a second vertex line intersecting the edge area and
        forms a second planar ring surface in the area of the second vertex line,
    the substrate being provided with a connecting channel between the first central area and the second central area;
  a first ceramic diaphragm
    which rests on and is fixed to the first ring surface of the substrate,
    with a third electrode being provided on a planar inner surface of the first diaphragm facing the substrate; and
  a second ceramic diaphragm
    which rests on and is fixed to the second ring surface of the substrate,
    with a fourth electrode being provided on a planar inner surface of the second diaphragm facing the substrate.

In the case of this prior-art differential pressure sensor cell, the ring surfaces, which serve exclusively to join the respective diaphragms to the substrate, extend up to the cylindrical surface of the substrate. The way the joint is produced is not explained.

It has turned out that the joint produced solely by means of the ring surfaces is insufficient, particularly if great axially parallel forces act on these surfaces. In addition, such a joint is not high-vacuum-tight and not long-term-stable.

SUMMARY OF THE INVENTION

It is therefore an object of the invention to provide capacitive pressure sensor cells or capacitive differential pressure sensor cells in which the joint between the substrate and the diaphragms is both pressure- and/or tension-proof and high-vacuum-tight and long-term-stable.

To attain this object, a first variant of the invention provides a capacitive pressure sensor cell comprising:

a ceramic substrate having
  a cylindrical surface,
  a first major surface and
  a second major surface,
    said second major surface being opposite said first major surface,
    said first major surface including a concave central area which, in the direction of and up to said cylindrical surface, merges into a convex surface having a vertex line,
    said convex surface forming a planar ring surface in the area of said vertex line,
  a first electrode located in said concave central area of said first major surface, and
  an electrical connection extending from said first electrode through said substrate to said second major surface; and
a ceramic diaphragm having a planar inner surface,
  a second electrode located on said planar inner surface of said diaphragm,
  said planar inner surface of said diaphragm resting on said planar ring surface of said first major surface of said substrate,
  said diaphragm being joined to said substrate by an active brazing solder
    which forms a circumferential wedge zone between said diaphragm and said substrate in the area of said substrate between said planar ring surface and said cylindrical surface,
  a high-vacuum-tight sensing chamber being formed between said planar inner surface of said diaphragm and said first major surface of said substrate, and
  electrical connection to said second electrode being made through said circumferential wedge zone.

To attain the above object, a second variant of the invention provides a capacitive differential pressure sensor cell comprising:
a ceramic substrate having
  a cylindrical surface and,
  at a first major surface, a concave first central area which
    is provided with a first electrode,
    has a first electrical connection from the first electrode through the substrate to a second major surface, and,
    in the direction of and up to the cylindrical surface, merges into a convex first surface having a first vertex line,
      said convex first surface forming a first planar ring surface in the area of the first vertex line,
  which substrate further has, at a second major surface opposite the first major surface, a concave second central area which
    is provided with a second electrode,
    has a second electrical connection from the second electrode through the substrate to the cylindrical surface, and,
    in the direction of and up to the cylindrical surface, merges into a convex second surface having a second vertex line,
      said convex second surface forming a second planar ring surface in the area of the second vertex line,
  said substrate further having a connecting channel between the first central area and the second central area;
a first ceramic diaphragm
  which rests on the first ring surface of the substrate, and
  which is joined to the substrate on the first ring surface and between the cylindrical surface and the first ring surface by means of active brazing solder forming a first circumferential wedge zone, to form a first high-vacuum-tight sensing chamber,
  with a third electrode being provided on a planar inner surface of the first diaphragm facing the substrate, to which third electrode contact is made through the first wedge zone; and
a second ceramic diaphragm
  which rests on the second ring surface of the substrate, and
  which is joined to the substrate on the second ring surface and between the cylindrical surface and the second ring surface by means of active brazing solder forming a second circumferential wedge zone, to form a second high-vacuum-tight sensing chamber,
  with a fourth electrode being provided on a planar inner surface of the second diaphragm facing the substrate, to which fourth electrode contact is made through the second wedge zone.

To attain the above object, a third variant of the invention provides a capacitive differential pressure sensor cell comprising:
a first ceramic substrate having
  a first cylindrical surface and,
  at a first major surface, a concave first central area which
    is provided with a first electrode,
    has an electrical connection from the first electrode through the first ceramic substrate to a second major surface opposite the first major surface, and,
    in the direction of and up to the cylindrical surface, merges into a convex first surface having a first vertex line,
      said convex first surface forming a first planar ring surface in the area of the first vertex line;
a second ceramic substrate having
  second cylindrical surface and,
  at a first major surface, a concave second central area which
    is provided with a second electrode,
    has a second electrical connection from the second electrode through the second ceramic substrate to a second major surface opposite the first major surface, and,
    in the direction of and up to the second cylindrical surface, merges into a convex second surface having a second vertex line,
      said convex second surface forming a second planar ring surface in the area of the second vertex line; and
a ceramic substrate which
  rests with a first surface on the first ring surface of the first substrate,
  is joined to the first substrate on the first ring surface and between the first cylindrical surface and the first ring surface of the first substrate by means of active brazing solder forming a first circumferential wedge zone, to form a first high-vacuum-tight sensing chamber,
  rests with a second surface on the second ring surface of the second substrate,
  is joined to the second substrate on the second ring surface and between the second cylindrical surface and the second ring surface of the second substrate by means of active brazing solder forming a second circumferential wedge zone, to form a second high-vacuum-tight sensing chamber, the first surface of the diaphragm being provided with a third electrode
   to which contact is made through the first wedge zone, and
the second surface being provided with a fourth electrode
   to which contact is made through the second wedge zone.

To attain the above object, a fourth variant of the invention provides a method for manufacturing a capacitive pressure sensor cell comprising the steps of:

providing a ceramic substrate having
   a cylindrical surface,
   a first major surface and
   a second major surface,
      said second major surface being opposite said first major surface,
      said first major surface including a concave central area which, in the direction of and up to said cylindrical surface, merges into a convex surface having a vertex line,
      said convex surface being formed into a planar ring surface in the area of said vertex line;
depositing a first electrode on said concave central area;
forming an electrical connection from said first electrode through said substrate to said second major surface;
providing a ceramic diaphragm having a planar inner surface;
depositing a second electrode on the central portion of said planar inner surface of said diaphragm such that, when said diaphragm is placed on said substrate, said second electrode extends up to said planar ring surface of said substrate;
applying an active brazing solder to said convex portion of said substrate between said cylindrical surface and said planar ring surface;
placing said diaphragm on said planar ring surface of said substrate such that said second electrode of said diaphragm extends up to said planar ring surface, and said second electrode faces said first electrode;
heating said substraic and said diaphragm in a vacuum or inert-gas atmosphere until the active brazing solder has melted; and
allowing said substrate and said diaphragm to cool down.

To attain the above object, a fifth variant of the invention provides a method for manufacturing a capacitive differential pressure sensor cell comprising the steps of:

providing a ceramic substrate, at the first major surface thereof, with a concave first central area
   which, in the direction of and up to a cylindrical surface, merges into a convex first surface having a first vertex line,
      said convex first surface being formed as a first planar ring surface in the area of the first vertex line;
depositing a first electrode on the first central area and providing a electrical connection from the first electrode through the substrate to the cylindrical surface of the substrate;
providing the substrate, at a second major surface opposite the first major surface, with a concave second central area
   which, in the direction of and up to a cylindrical surface of the substrate, merges into a convex second surface having a second vertex line,
      said convex second surface being formed as a second planar ring surface in the area of the second vertex line;
depositing a second electrode on the second central area and providing an electrical connection from the second electrode through the substrate to the cylindrical surface of the substrate;
providing a first ceramic diaphragm congruent with the first major surface of the substrate, on a planar inner surface thereof, with a third electrode dimensioned so that, after the first diaphragm has been placed on the first ring surface of the substrate, the third electrode extends up to said first ring surface;
providing a second ceramic diaphragm congruent with the second major surface of the substrate, on a planar inner surface thereof, with a fourth electrode dimensioned so that, after the second diaphragm has been placed on the second ring surface of the substrate, said fourth electrode extends up to said second ring surface;
applying respective quantities of active brazing solder sufficient to braze the first and second diaphragms to the substrate to portions of the convex first surface of the substrate located between the first ring surface and the cylindrical surface and to portions of the convex second surface of the substrate located between the second ring surface and the cylindrical surface;
placing the surface of the first diaphragm provided with the third electrode on the first ring surface of the substrate;
placing the surface of the second diaphragm provided with the fourth electrode on the second ring surface of the substrate; and
heating the substrate and the diaphragm in a vacuum or inert-gas atmosphere until the active brazing solder has melted, and then allowing them to cool down.

To attain the above object, a sixth variant of the invention provides a method for manufacturing a capacitive differential pressure sensor cell comprising the steps of:

providing a first ceramic substrate, at a first major surface thereof, with a concave first central area
   which, in the direction of and up to a first cylindrical surface, merges into a convex first surface having a first vertex line, said convex first surface being formed as a first planar ring surface in the area of the first vertex line;
depositing a first electrode on the first central area and providing an electrical connection from the first electrode through the first substrate to a second major surface of the substrate opposite the first major surface;
providing a second ceramic substrate, at a first major surface thereof, with a concave second central area
   which, in the direction of and up to the second cylindrical surface of the second substrate, merges into a convex second surface having a second vertex line,
      said convex second surface being formed as a second planar ring surface in the area of the second vertex line;
depositing a second electrode on the second central area and providing an electrical connection from the second electrode through the second substrate to a second major surface of the second substrate opposite the first major surface;

providing a ceramic diaphragm congruent with the first major surface of the first substrate, on a planar first surface thereof, with a third electrode dimensioned so that, after the diaphragm has been placed on the first ring surface of the first substrate, said third electrode extends up to said first ring surface;

providing a planar second surface of the diaphragm opposite the first surface with a fourth electrode dimensioned so that, after the diaphragm has been placed on the second ring surface of the second substrate, said fourth electrode extends up to said second ring surface;

applying respective quantities of active brazing solder sufficient to braze the first and second diaphragms to the substrate to portions of the convex first surface of the substrate located between the first ring surface and the cylindrical surface and to portions of the convex second surface of the substrate located between the second ring surface and the cylindrical surface;

placing the first surface of the diaphragm, provided with the third electrode, on the first ring surface of the substrate;

placing the second surface of the diaphragm, provided with the fourth electrode, on the second ring surface of the substrate; and heating the substrate and diaphragm in a vacuum or inert-gas atmosphere until the active brazing solder has melted, and then allowing them to cool down.

In respective preferred embodiments of the first to third variants of the invention, the substrate or substrates and the diaphragm or diaphragms are made of alumina ceramic, and the active brazing solder is a Zr—Fe—Ti—Be alloy or a Zr—Ni—Ti alloy.

In respective further preferred embodiments of the first to third variants of the invention, at least the electrode of the diaphragm or the electrodes of the diaphragms are covered, at least in a respective edge region, with a solder resist layer.

In preferred embodiments of the fourth and fifth variants of the invention, at least the electrode of the diaphragm or the electrodes of the diaphragms are covered, at least in a respective edge region, with a solder resist layer.

The basic idea of the invention is, instead of holding the diaphragm and the substrate at a distance from each other at a joint by a quantity of active brazing solder as has been done so far, to braze the diaphragm and the substrate outside the area where they rest on each other by means of such a quantity of active brazing solder that long-term stability and high-vacuum tightness are ensured.

One advantage of the invention is that in contrast to the prior art, the volume of the sensing chamber does not depend on the thickness of the ring of active brazing solder and on manufacturing tolerances resulting after the brazing.

Another advantage of the invention is that an expensive formed part of active brazing solder is no longer necessary. Such formed parts have to be produced by the complex and costly melt-spinning process.

The invention is particularly suited for automated application of a active brazing solder paste by means of a dispenser. The special shape and arrangement of the joint between diaphragm and substrate ensures that solvents commonly contained in an active brazing solder paste will escape from the region of the joint residue-free.

A further advantage of the invention is that the special shape of the substrate or substrates in the region of the joint or joints ensures that no active brazing solder will penetrate into the sensing chamber or sensing chambers.

BRIEF DESCRIPTION OF THE DRAWINGS

The invention will become more apparent from the following description of embodiments when taken in conjunction with the accompanying drawings. Like parts are designated by like reference characters throughout the FIGS.; to simplify the illustration, reference characters that have already been used are not repeated in subsequent FIGS. In the drawings:

FIG. 1*a* is a schematic perspective view of a substrate of a pressure sensor cell of a first variant of the invention;

FIG. 1*b* is a schematic perspective view of a diaphragm of the pressure sensor cell of FIG. 1*a*;

FIG. 2 is a schematic vertical section of the first variant of the invention;

DETAILED DESCRIPTION OF THE PREFERRED EMBODIMENTS

Figure 3A:
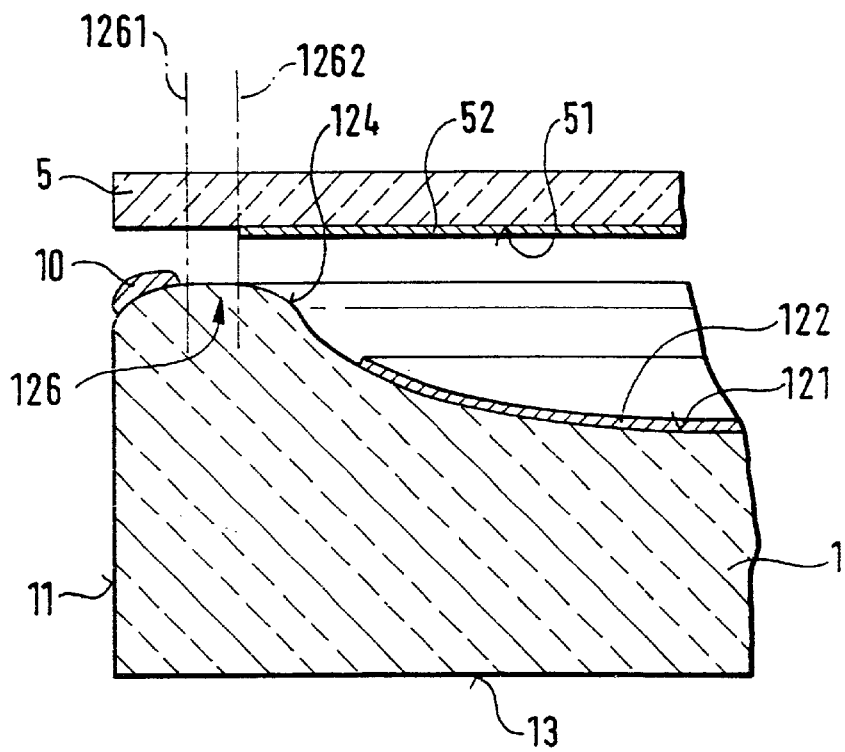
FIG. 3*a* shows an enlarged view of a section III of the pressure sensor cell of FIG. 2 before the diaphragm is joined to the substrate.

Referring to FIG. 1*a*, there is shown a perspective view of a ceramic substrate 1 of a capacitive pressure sensor cell which has a cylindrical surface 11 and, at a first major surface 12, a concave central area 121 provided with a first electrode 122. In the direction of and up to cylindrical surface 11, central area 121 merges into a convex area 124, which has a vertex line 125 and forms a planar ring surface 126 in the area of vertex line 125 (see FIG. 2).

FIG. 1*b* is a perspective view of a ceramic diaphragm 5 whose planar inner surface 51, which will face the substrate 1 of FIG. 1*a* after it has been fixed to the latter, is provided with an electrode 52, which is a second electrode 52 the pressure sensor cell.

FIG. 2 shows a vertical section through a pressure sensor cell according to the first variant of the invention. The ceramic diaphragm 5 depicted in FIG. 1*b* rests on ring surface 126 of substrate 1. Diaphragm 5 and the portion of convex surface 124 extending between ring surface 126 and cylindrical surface 11 form a circumferential wedge zone 91. By means of active brazing solder 10 in wedge zone 91, diaphragm 5 is joined to substrate 1 to form a high-vacuum-tight sensing chamber 9.

Contact is made to electrode 52 on diaphragm 5 through wedge zone 91. An electrical connection 123 is provided from electrode 122 through substrate 1 to a second major surface 13 of substrate 1. Electrode 122 and electrode 52 together form a capacitor which provides a signal corresponding to the pressure acting on diaphragm 5.

FIG. 2 clearly shows how central area 121 merges into convex surface 124 in the direction of and up to cylindrical surface 11. In the area of vertex line 125 bounded in FIG. 2 by dashed lines 1261 and 1262, convex surface 124 forms a planar ring surface 126. A central line CL illustrates that the pressure sensor cell is preferably rotationally symmetrical.

FIG. 3*a* shows an enlarged view of section III of the pressure sensor cell of FIG. 2 prior to the joining of diaphragm 5 to substrate 1. It shows clearly how central area 121 merges into convex surface 124 in the direction of and up to cylindrical surface 11. In the area of vertex line 125 bounded by dashed lines 1261 and 1262 (see FIG. 2) convex surface 124 forms a planar ring surface 126. Electrode 52 of diaphragm 5 extends up to the portion of inner surface 51 of diaphragm 5 which will subsequently rest on substrate 1. By contrast, electrode 122 is confined to concave central area 121 of substrate 1 and does not extend up to convex surface 124.

Before diaphragm 5 is placed on substrate 1, active brazing solder 10 is applied to the portion of convex surface 12 (see FIG. 1) of substrate 1 which extends between cylindrical surface 11 and ring surface 126. Preferably, use is made of an active brazing solder paste which is applied by means of a suitable dispenser and in a quantity sufficient to join diaphragm 5 and substrate 1. However, other processes by which active brazing solder 10 can be applied to substrate 1 are also conceivable.

Figure 3B:
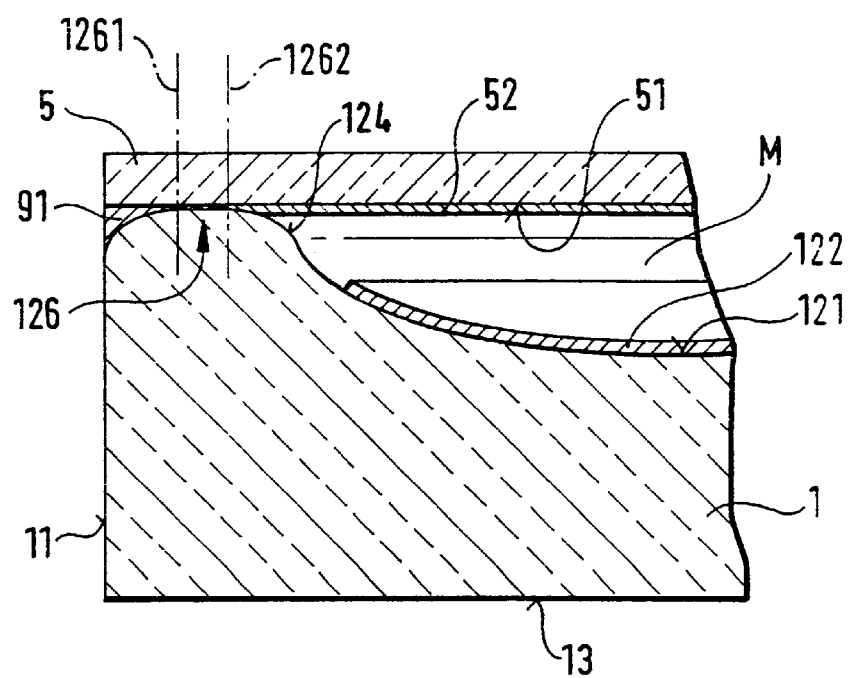
FIG. 3*b* shows the section III of the pressure sensor cell of FIG. 3*a* after the diaphragm has been joined to the substrate.

After diaphragm 5 has been joined to substrate 1, the solidified active brazing solder 10 fills the wedge zone 91 formed between diaphragm 5 and substrate 1, as shown in FIG. 3b. Although diaphragm 5 rests firmly on planar ring surface 126, because of the ceramic material used for the substrate and diaphragm microscopically small pores with diameters of the order of their grain sizes are formed between the substrate and diaphragm.

Because of its wetting properties, the active brazing solder 10 migrates in the pores between diaphragm 5 and ring surface 126 of substrate 1 from wedge zone 91 to an inner edge of ring surface 126, and thus to electrode 52. The latter is wetted by active brazing solder 10, so that an electrical connection is provided between wedge zone 91 and electrode 52.

Figure 4:
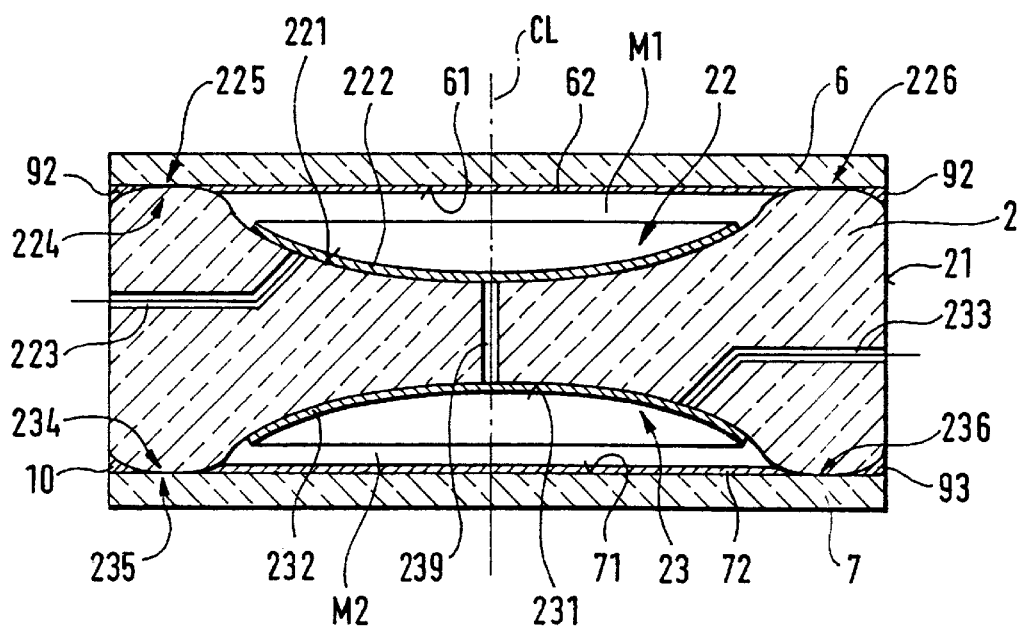
FIG. 4 is a schematic vertical section of a second variant of the invention.

FIG. 4 shows a schematic vertical section of a capacitive differential pressure sensor cell according to a second variant of the invention which comprises a ceramic substrate 2 having a cylindrical surface 21 and, at a first major surface 22, a concave first central area 221 which is provided with a first electrode 222. A first electrical connection 223 is provided from first electrode 222 through substrate 2 to cylindrical surface 21.

In the direction of and up to cylindrical surface 21, central area 21 merges into a convex first surface 224, which has a first vertex line 225 and which forms a first planar ring surface 226 in the area of vertex line 225.

At a second major surface 23 opposite major surface 22, substrate 2 has a concave second central area 231, which is provided with a second electrode 232. A second electrical connection 233 is provided from second electrode 232 through substrate 2 to cylindrical surface 21.

In the direction of and up to cylindrical surface 21, the second central area 231 merges into a convex second surface 234, which has a second vertex line 235 and which forms a second planar ring surface 236 in the area of vertex line 235. The first and second central areas 221, 231 are connected with one another through a connecting channel 239.

A first ceramic diaphragm 6 rests on ring surface 226 of substrate 2. This diaphragm 6 and the portion of convex surface 224 which extends between ring surface 226 and cylindrical surface 21 form a first circumferential wedge zone 92. By means of active brazing solder 10 in wedge zone 92, diaphragm 6 is joined to substrate 2 to form a first high-vacuum-tight sensing chamber M1.

On a planar first inner surface 61 of diaphragm 6 facing substrate 2, a third electrode 62 is provided, to which contact is made through first wedge zone 92. Third electrode 62 and electrode 222 on substrate 2 form a first capacitor.

A second ceramic diaphragm 7 rests on ring surface 236 of substrate 2. This diaphragm 7 and the portion of convex surface 234 which extends between ring surface 236 and cylindrical surface 21 form a second circumferential wedge zone 93. By means of active brazing solder 10 in wedge zone 93, diaphragm 7 is joined to substrate 2 to form a second high-vacuum-tight sensing chamber M2.

On a planar inner surface 71 of diaphragm 7 facing the substrate 2, a fourth electrode 72 is provided, to which contact is made through the second wedge zone 93. Electrode 72 and electrode 232 together form a second capacitor.

Figure 5:
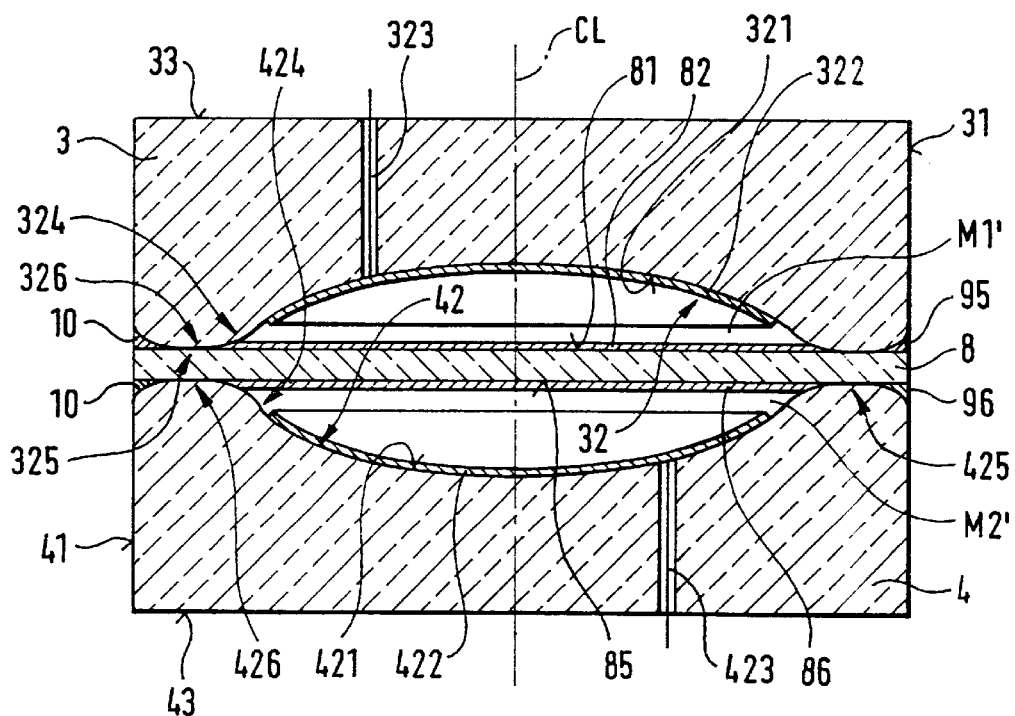
FIG. 5 is a schematic vertical section of a third variant of the invention.

FIG. 5 shows a vertical section of a capacitive differential pressure sensor cell according to a third variant of the invention. This differential pressure sensor cell comprises a first ceramic substrate 3, which has a first cylindrical surface 31 and, at a first major surface 32, a concave first central area 321. The latter is provided with a first electrode 322, and a first electrical connection 323 is provided from electrode 322 through substrate 3 to a second major surface 33 opposite first major surface 32. In the direction of and up to cylindrical surface 31, central area 321 merges into a convex first surface 324, which has a first vertex line 325 and which forms a first planar ring surface 326 in the area of vertex line 325.

The differential pressure sensor cell further comprises a second ceramic substrate 4, which has a second cylindrical surface 41 and, at a first major surface 42, a concave second central area 421. The latter is provided with a second electrode 422, and a second electrical connection 423 is provided from electrode 422 through substrate 4 to a second major surface 43 opposite first major surface 42. In the direction of and up to cylindrical surface 41, central area 421 merges into a convex second surface 424, which has a second vertex line 425. In the area of the second vertex line 425, convex surface 424 forms a second planar ring surface 426.

A ceramic diaphragm 8 rests with a first planar inner surface 81 on ring surface 326 of first substrate 3. Diaphragm 8 and the portion of convex surface 324 which extends between ring surface 326 and cylindrical surface 31 of substrate 3 form a first circumferential wedge zone 95. By means of active brazing solder 10 in wedge zone 95, the diaphragm 8 is joined to substrate 3 to form a first high-vacuum-tight sensing chamber M1'.

Diaphragm 8 rests with a second planar inner surface 85 on ring surface 426 of second substrate 4. The diaphragm 8 and the portion of convex surface 424 which extends between ring surface 426 and cylindrical surface 41 form a second circumferential wedge zone 96. By means of active brazing solder 10 in wedge zone 96, diaphragm 8 is joined to substrate 4 to form a second high-vacuum-tight sensing chamber M2'.

The inner surface 81 of diaphragm 8 is provided with a third electrode 82, to which contact is made through wedge zone 95. The inner surface 85 of diaphragm 8 is provided with a fourth electrode 86, to which contact is made through wedge zone 96. The first electrode 322 on substrate 3 and the third electrode 82 form a first capacitor, and the second electrode 422 on substrate 4 and the fourth electrode 86 form a second capacitor.

All of the substrates and diaphragms mentioned above and shown in FIGS. 1 to 5, i.e., substrates 1, 2, 3, 4 and diaphragms 5, 6, 7, 8, are preferably of alumina ceramic, particularly of a 96% alumina ceramic. In all cases, an active brazing solder 10 of a Zr—Fe—Ti—Be alloy (cf. EP-A 835 716) or a Zr—Ni—Ti alloy (cf. U.S. Pat. No. 5,334,344) has proved particularly advantageous since such an active brazing solder has an excellent wetting ability, high strength, and a coefficient of thermal expansion corresponding to that of the ceramic material of diaphragm 5 and sub-strate 1. For the electrodes, tantalum can be used (cf. U.S. Pat. No. 5,050, 034).

To make sure that no active brazing solder paste can penetrate into the sensing chambers M, M1, M2, M1', and M2', it has proved advantageous to cover electrode 52 on diaphragm 5, electrodes 82 and 86 on diaphragm 8, and electrodes 62 and 72 on diaphragms 6 and 7, respectively, with a solder resist layer. If tantalum is used for electrodes 52, 62, 72, 82, 86, such a solder resist cover can be implemented in a particularly simple manner with a tantalum-oxide layer.

The electrical connections through the substrates can be produced as described in U.S. Pat. No. 5,154,697 or U.S. Pat. No. 5,050,035, for example.

The pressure sensor cell of FIG. 2 is manufactured as follows. The ceramic substrate 1 is provided, at its first major surface 12, with the concave central area 121, which is shaped so as to merge into the convex surface 124 in the direction of and up to the cylindrical surface 11. The convex surface 124 is flattened in the area of its vertex line 125 to form the planar ring surface 126. This is achieved by grinding the substrate 1 in a suitable manner.

Electrode 122 is deposited on central area 121, and an electrical connection is made from this electrode through substrate 1 to the second major surface 13 of the substrate in the usual manner.

On a planar inner surface 51, ceramic diaphragm 5 is provided with the second electrode 52, which is so dimensioned that, after diaphragm 5 has been placed on ring surface 126 of substrate 1, this electrode extends only up to ring surface 126.

A sufficient quantity of active brazing solder 10 is applied to the portions of convex surface 124 between ring surface 126 and cylindrical surface 11. Preferably, use is made of an active brazing solder paste which is applied to substrate 1 by means of a suitable dispenser.

Next, the inner surface 51 of diaphragm 5, provided with the second electrode 52, is placed on ring surface 126 of substrate 1, and substrate 1 and diaphragm 5 are heated in a vacuum or inert-gas atmosphere until the active brazing solder 10 has melted. After substrate 1 and diaphragm 5 have cooled down, the pressure sensor cell shown in FIG. 2 is complete.

The differential pressure sensor cell of FIG. 4 is manufactured as follows. The first major surface 22 of the ceramic substrate 2 is provided with the concave central area 221, which merges into the convex surface 224 in the direction of and up to the cylindrical surface 21. In the area of the vertex line 225 of the convex area 224, the latter is formed into the planar ring surface 226. Electrode 222 is deposited on central area 221, and an electrical connection is provided from electrode 222 through substrate 2 to the cylindrical surface 21 of the substrate.

At its second major surface 23, substrate 2 is provided with the concave central area 231, which merges into the convex area 234 in the direction of and up to the cylindrical surface 21 of substrate 2. Convex area 234 is also flattened in the area of its vertex line 235 to form the planar ring surface 236. Electrode 232 is deposited on central area 231, and an electrical connection is provided from electrode 232 through substrate 2 to cylindrical surface 21.

The planar inner surface 61 of diaphragm 6 is provided with electrode 62, which is dimensioned so as to extend up to, and only up to, ring surface 226 after diaphragm 6 has been placed on the ring surface 226. The planar inner surface 71 of diaphragm 7 is provided with electrode 72, which is dimensioned so as to extend up to ring surface 236 after diaphragm 7 has been placed on the ring surface 236.

Next, quantities of active brazing solder 10 sufficient to braze diaphragms 6 and 7 to substrate 2 are applied to those portions of the convex surfaces 224, 234 of substrate 2 which are located between the respective ring surfaces 226, 236 and the cylindrical surface 21. For this, too, an active brazing solder paste is preferably used, which is applied by means of a suitable dispenser.

After that, diaphragm 6, provided with electrode 62 on its inner surface 61, is placed on ring surface 226 of substrate 2, and diaphragm 7, provided with electrode 72 on its inner surface 71, is placed on ring surface 236. Then, substrate 2 and diaphragms 6, 7 are heated in a vacuum or inert-gas atmosphere until the active brazing solder 10 has melted, and subsequently allowed to cool down.

The differential pressure sensor cell of FIG. 5 is made as follows. The major surface 32 of the ceramic substrate 3 is provided with the concave central area 321, which merges into convex surface 324 in the direction of and up to cylindrical surface 31 of substrate 3. In the area of its vertex line 325, convex surface 324 is formed as a planar ring surface 326. Electrode 322 is deposited on central area 321, and an electrical connection is made from electrode 322 through substrate 3 to surface 33 of substrate 3.

The major surface 42 of substrate 4 is provided with the concave central area 421, which merges into the convex surface 424 in the direction of and up to cylindrical surface 41. In the area of its vertex line 425, the convex surface 424 is formed as a planar ring surface 426. Electrode 422 is deposited on central area 421, and an electrical connection is made from electrode 422 through substrate 4 to surface 43 of substrate 4.

The planar inner surface 81 of the ceramic diaphragm 8 is provided with the electrode 82, which is dimensioned so as to extend up to the ring surface 326 of the first substrate 3 after diaphragm 8 has been placed on the ring surface 326. On its other planar inner surface 85, diaphragm 8 is provided with electrode 86, which is dimensioned so as to extend up to ring surface 426 of substrate 4 after diaphragm 8 has been placed on the ring surface 426.

Quantities of active brazing solder 10 sufficient to braze diaphragm 8 to substrates 3 and 4 are applied to the portion of convex surface 324 of substrate 3 located between ring surface 326 and cylindrical surface 31 and to the portion of convex surface 424 of substrate 4 located between ring surface 426 and cylindrical surface 41. In this case, too, an active brazing solder paste is preferably used, which is applied by means of a suitable dispenser.

Next, the inner surface 81 of diaphragm 8, provided with electrode 82, is placed on ring surface 326 of substrate 3, and the inner surface 85 of diaphragm 8, provided with electrode 86, is placed on ring surface 426 of substrate 4.

Thereafter, substrates 3, 4 and diaphragm 8 are heated in a vacuum or inert-gas atmosphere until the active brazing solder 10 has melted, and allowed to cool down.

What is claimed is:

1. A capacitive pressure sensor cell comprising:
   a ceramic substrate having
      a cylindrical surface,
      a first major surface and
      a second major surface,
         said second major surface being opposite said first major surface, said first major surface including a concave central area which, as the concave central area extends toward said cylindrical surface, merges into a convex surface having a vertex line,
said convex surface forming a planar ring surface proximate to said vertex line,
a first electrode located in said concave central area of said first major surface, and
an electrical connection extending from said first electrode through said substrate to said second major surface; and
a ceramic diaphragm having a planar inner surface,
a second electrode located on said planar inner surface of said diaphragm,
said planar inner surface of said diaphragm resting on said planar ring surface of said first major surface of said substrate,
said diaphragm being joined to said substrate by an active brazing solder
which is located in a circumferential wedge zone formed between said diaphragm and said substrate and between said planar ring surface and said cylindrical surface, the circumferential wedge zone being configured to inhibit the active brazing solder from entering the concave central area,
a high-vacuum-tight sensing chamber being formed between said planar inner surface of said diaphragm and said first major surface of said substrate, and
electrical connection to said second electrode being made through said circumferential wedge zone.

2. The pressure sensor cell as claimed in claim 1 wherein the substrate and the diaphragm are made of alumina ceramic, and the active brazing solder is a Zr—Fe—Ti—Be alloy or a Zr—Ni—Ti alloy.

3. The pressure sensor cell as claimed in claim 1 wherein at lease the electrode of the diaphragm is covered, at least in a respective edge region, with a solder resist layer.

4. A capacitive differential pressure sensor cell comprising:
a ceramic substrate having
a cylindrical surface and,
at a first major surface, a concave first central area which
is provided with a first electrode,
has a first electrical connection from the first electrode through the substrate to a second major surface, and,
as the concave first central area extends toward the cylindrical surface, merges into a convex first surface having a first vertex line,
said convex first surface forming a first planar ring surface proximate to the first vertex line,
which substrate further has, at a second major surface opposite the first major surface, a concave second central area which
is provided with a second electrode,
has a second electrical connection from the second electrode through the substrate to the cylindrical surface, and,
as the concave second central area extends toward the cylindrical surface, merges into a convex second surface having a second vertex line,
said convex second surface forming a second planar ring surface proximate to the second vertex line,
said substrate further having a connecting channel between the first central area and the second central area;

a first ceramic diaphragm
which rests on the first ling surface of the substrate, and
which is joined to the substrate on the first ring surface and between the cylindrical surface and the first ring surface by means of active brazing solder located in a first circumferential wedge zone, to form a first high-vacuum-tight sensing chamber, the circumferential wedge zone being configured to inhibit the active brazing solder from entering the concave central area,
with a third electrode being provided on a planar inner surface of the first diaphragm facing the substrate,
to which third electrode contact is made through the first wedge zone; and
a second ceramic diaphragm
which rests on the second ring surface of the substrate, and
which is joined to the substrate on the second ring surface and between the cylindrical surface and the second ring surface by means of active brazing solder forming a second high-vacuum-tight sensing chamber,
with a fourth electrode being provided on a planar inner surface of the second diaphragm facing the substrate,
to which fourth electrode contact is made through the second wedge zone.

5. The differential pressure sensor cell as claimed in claim 4 wherein the substrate and the diaphragms are made of alumina ceramic, and the active brazing solder is a Zr—Fe—Ti—Be alloy or a Zr—Ni—Ti alloy.

6. The differential pressure sensor cell as claimed in claim 4 wherein at least the electrodes of the diaphragms are covered, at least in a respective edge region, with a solder resist layer.

7. A capacitive differential pressure sensor cell comprising;
a first ceramic substrate having
first cylindrical surface and,
at a first major surface, a concave first central area which
is provided with a first electrode,
has an electrical connection from the first electrode through the first ceramic substrate to a second major surface opposite the first major surface, and
as the concave first central area extends toward the cylindrical surface, merges into a convex first surface having a first vertex line,
said convex first surface forming a first planar ring surface proximate to the first vertex line;
a second ceramic substrate having
second cylindrical surface and,
at a first major surface, a concave second central area which
is provided with a second electrode,
has a second electrical connection from the second electrode through the second ceramic substrate to a second major surface opposite the first major surface, and,
as the concave second central area extends toward the second cylindrical surface, merges into a convex second surface having a second vertex line,
said convex second surface forming a second planar ring surface proximate to the second vertex line; and
a ceramic diaphragm which
rests with a first surface on the first ring surface of the first substrate, is joined to the first substrate on the first ring surface and between the first cylindrical surface and the first ring surface of the first substrate by means of active brazing solder located in a first circumferential wedge zone, to form a first high-vacuum-tight sensing chamber, the first circumferential wedge zone being configured to inhibit the active brazing solder from entering the concave first central area, rests with a second surface on the second ring surface of the second substrate, is joined to the second substrate on the second ring surface and between the second cylindrical surface and the second ring surface of the second substrate by means of active brazing solder located in a second circumferential wedge zone, to form a second high-vacuum-tight sensing chamber, the circumferential wedge zone being configured to inhibit the active brazing solder from entering the concave second central area, the first surface of the diaphragm being provided with a third electrode to which contact is made through the first wedge zone, and the second surface being provided with a fourth electrode to which contact is made through the second wedge zone.

8. The differential pressure sensor cell as claimed in claim 7 wherein the substrates and the diaphragm are made of alumina ceramic, and the active brazing solder is a Zr—Fe—Ti—Be alloy or a Zr—Ni—Ti alloy.

9. The differential pressure sensor cell as claimed in claim 7 at least the electrodes of the diaphragm are covered, at least in a respective edge region, with a solder resist layer.

10. A method for manufacturing a capacitive pressure sensor cell comprising the steps of:

providing a ceramic substrate having
a cylindrical surface,
a first major surface and
a second major surface,
said second major surface being opposite said first major surface,
said first major surface including a concave central area which, as the concave central area extends toward said cylindrical surface, merges into a convex surface having a vertex line,
said convex surface being formed into a planar ring surface proximate to said vertex line;

depositing a first electrode on said concave central area;

forming an electrical connection from said first electrode through said substrate to said second major surface;

providing a ceramic diaphragm having a planar inner surface;

depositing a second electrode on the central portion of said planar inner surface of said diaphragm such that, when said diaphragm is placed on said substrate, said second electrode extends up to said planar ring surface of said substrate;

applying an active brazing solder to said convex portion of said substrate between said cylindrical surface and said planar ring surface which convex portion is configured to inhibit the active brazing solder from entering the concave central area;

placing said diaphragm on said planar ring surface of said substrate such that said second electrode of said diaphragm extends up to said planar ring surface, and said second electrode faces said first electrode;

heating said substrate and said diaphragm in a vacuum or inert-gas atmosphere until the active brazing solder has melted; and allowing said substrate and said diaphragm to cool down.

11. The method as claimed in claim 10 wherein at least the electrode of the diaphragm is covered, at least in a respective edge region, with a solder resist layer.

12. A method for manufacturing a capacitive differential pressure sensor cell comprising the steps of;

providing a ceramic substrate, at the first major surface thereof, with a concave first central area
which, as the concave first central area extends toward a cylindrical surface, merges into a convex first surface having a first vertex line,
said convex first surface being formed as a first planar ring surface in the area of the first vertex line;

depositing a first electrode on the first central area and providing an electrical connection from the first electrode through the substrate to the cylindrical surface of the substrate;

providing the substrate, at a second major surface opposite the first major surface, with a concave second central area
which, as the concave second central area extends toward the cylindrical surface of the substrate, merges into a convex second surface having a second vertex line,
said convex second surface being formed as a second planar ring surface proximate to the second vertex line;

depositing a second electrode on the second central area and providing an electrical connection from the second electrode through the substrate to the cylindrical surface of the substrate;

providing a first ceramic diaphragm congruent with the first major surface of the substrate, on a planar inner surface thereof, with a third electrode dimensioned so that, after the first diaphragm has been placed on the first ring surface of the substrate, the third electrode extends up to said first ring surface;

providing a second ceramic diaphragm congruent with the second major surface of the substrate, on a planar inner surface thereof, with a fourth electrode dimensioned so that, after the second diaphragm has been placed on the second ring surface of the substrate, said fourth electrode extends up to said second ring surface;

applying respective quantities of active brazing solder sufficient to braze the first and second diaphragms to the substrate to portions of the convex first surface of the substrate located between the first ring surface and the cylindrical surface and to portions of the convex second surface of the substrate located between the second ring surface and the cylindrical surface to inhibit the active brazing solder from entering the concave first central area and the concave second central area;

placing the surface of the first diaphragm provided with the third electrode on the first ring surface of the substrate;

placing the surface of the second diaphragm provided with the fourth electrode on the second ring surface of the substrate; and heating the substrate and the diaphragm in a vacuum or inert-gas atmosphere until the active brazing solder has melted, and then allowing them to cool down.

13. The method as claimed in claim 12 wherein at least the electrodes of the diaphragms are covered, at least in a respective edge region, with a solder resist layer.

14. A method for manufacturing a capacitive differential pressure sensor cell comprising the steps of:

providing a first ceramic substrate, at a first major surface thereof, with a concave first central area
which, as the concave first central area extends toward a first cylindrical surface, merges into a convex first surface having a first vertex line, said convex first surface being formed as a first planar ring surface proximate to the first vertex line;

depositing a first electrode on the first central area and providing an electrical connection from the first electrode through the first substrate to a second major surface of the substrate opposite the first major surface;

providing a second ceramic substrate, at a first major surface thereof, with a concave second central area
which, as the concave second central area extends toward the second cylindrical surface of the second substrate, merges into a convex second surface having a second vertex line,
said convex second surface being formed as a second planar ring surface proximate to the second vertex line;

depositing a second electrode on the second central area and providing an electrical connection from the second electrode through the second substrate to a second major surface of the second substrate opposite the first major surface;

providing a ceramic diaphragm congruent with the first major surface of the first substrate, on a planar first surface thereof, with a third electrode dimensioned so that, after the diaphragm has been placed on the first ring surface of the first substrate, said third electrode extends up to said first ring surface;

providing a planar second surface of the diaphragm opposite the first surface with a fourth electrode dimensioned so
that, after the diaphragm has been placed on the second ring surface of the second substrate, said fourth electrode extends up to said second ring surface;

applying respective quantities of active brazing solder sufficient to braze the first and second diaphragms to the substrate to portions of the convex first surface of the substrate located between the first ring surface and the cylindrical surface and to portions of the convex second surface of the substrate located between the second ring surface and the cylindrical surface to inhibit the active brazing solder from entering the concave first central area and the concave second central area;

placing the first surface of the diaphragm, provided with the third electrode, on the first ring surface of the substrate;

placing the second surface of the diaphragm, provided with the fourth electrode, on the second ring surface of the substrate; and heating the substrate and diaphragm in a vacuum or inert-gas atmosphere until the active brazing solder has melted, and then allowing them to cool down.

15. The method as claimed in claim 14 wherein at least the electrodes of the diaphragm are covered, at least in a respective edge region, with a solder resist layer.

16. A pressure sensor apparatus, comprising:

a substrate having a generally concave surface configured to define a sensing chamber in the substrate, a mounting surface surrounding the sensing chamber, and a sealing surface located outside the sensing chamber and configured to extend away from the mounting surface in the same direction as the generally concave surface;

a first electrode located in the sensing chamber;

a first electrical connection coupled to the first electrode;

a diaphragm having an inner surface abutting the mounting surface of the substrate and extending over the sensing chamber, the diaphragm including a second electrode located adjacent the first electrode;

a second electrical connection coupled to the second electrode; and a sealing material located outside of the sensing chamber between the sealing surface of the substrate and the diaphragm to couple the diaphragm to the substrate, whereby the sealing material is inhibited from entering the sensing chamber.

17. The apparatus of claim 16, wherein the sealing material includes an active brazing solder.

18. The apparatus of claim 17, wherein the substrate and the diaphragm include alumina ceramic and the active brazing solder includes at least one of a Zr—Fe—Ti—Be alloy and a Zr—Ni—Ti alloy.

19. The apparatus of claim 18, wherein the second electrode is covered, at least in part, by a solder resistant layer.

20. The apparatus of claim 16, wherein the substrate includes a convex surface having a first convex portion located adjacent the concave surface defining the sensing chamber and a second convex portion located outside the sensing chamber, the second convex portion being configured to form the sealing surface, and the mounting surface of the substrate being located between the first and second convex portions.

21. The apparatus of claim 20, wherein the sealing material includes an active brazing solder.

22. The apparatus of claim 21, wherein the substrate and the diaphragm include alumina ceramic and the active brazing solder includes at least one of a Zr—Fe—Ti—Be alloy and a Zr—Ni—Ti alloy.

23. The apparatus of claim 22, wherein the second electrode is covered, at least in part, by a solder resistant layer.

* * * * *